Oct. 20, 1964   J. G. SAWYER   3,153,508
VEHICLE MOUNTED AIR COMPRESSOR
Filed Aug. 4, 1961   3 Sheets-Sheet 1

INVENTOR.
James G. Sawyer,
BY
Christel & Beau
ATTORNEYS

INVENTOR.
James G. Sawyer,
BY
Christel + Bean.
ATTORNEYS.

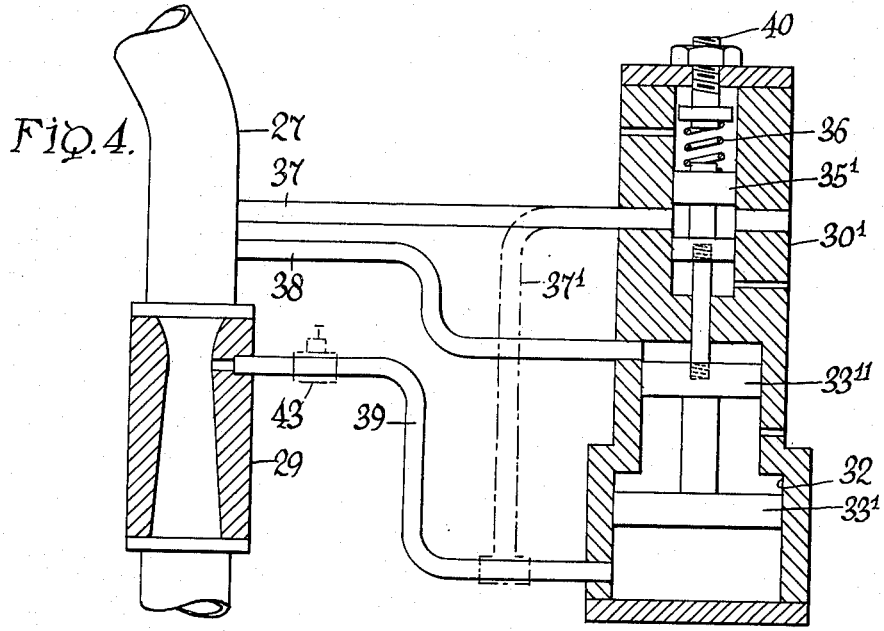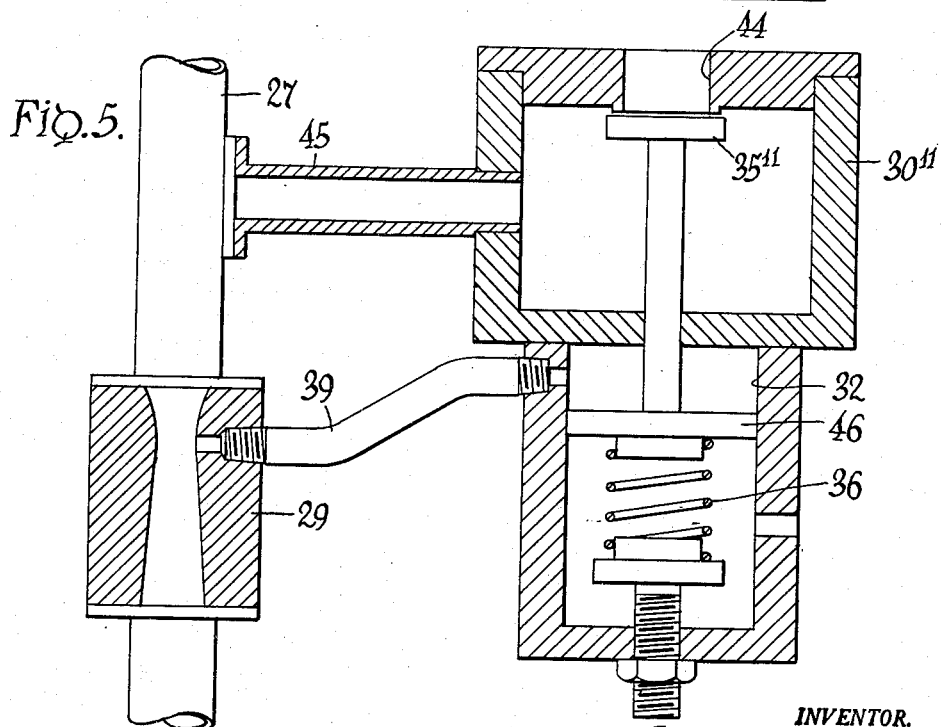

ary Oct. 20, 1964

3,153,508
VEHICLE MOUNTED AIR COMPRESSOR
James G. Sawyer, Snyder, N.Y., assignor to General
Turbine Corp., Buffalo, N.Y.
Filed Aug. 4, 1961, Ser. No. 129,275
19 Claims. (Cl. 230—39)

This invention relates generally to the compressor art, and more specifically to a new and useful compressor particularly for use in limited space applications such as on a vehicle to be driven by the engine thereof.

The primary object of my invention is to provide a compressor which will generate a supply of compressed air sufficient to operate air driven tools as well as other air consuming devices, while being of a size to fit within the area available under the hood of a conventional truck or other vehicle. For example, a compressor of my invention will fit under the hood of a standard truck, and will generate 120 cubic feet per minute of air at a pressure of 100 pounds per square inch.

Another object of my invention is to accomplish the foregoing in a construction which is simple, durable and dependable, while being relatively inexpensive, thereby providing an extremely practical and economical compressor for the purpose.

In one aspect thereof, a vehicle mounted air compressor constructed in accordance with my invention is characterized by the provision of a first compressor stage mounted on the vehicle, a second compressor stage also mounted on the vehicle, the first and second compressor stages being driven from the vehicle power plant, with one or more conduits interconnecting the first compressor stage outlet and the second compressor stage inlet, the conduits including a heat exchanger arranged in heat exchange relation to the vehicle cooling system for interstage cooling of partially compressed air.

In another aspect thereof, a vehicle mounted air compressor of my invention is characterized by the combination, with first and second compressor stages having interstage cooling as set forth above, of air flow control means automatically operable to maintain a predetermined minimum flow of air through the second stage outlet at all times during operation of the compressor.

The foregoing and other objects, advantages and characterizing features of a vehicle mounted air compressor of my invention will become clearly apparent from the ensuing detailed description thereof, taken in conjunction with the accompanying drawings wherein like reference numerals denote like parts throughout the various views and wherein:

FIG. 1 is a generally schematic, top plan view of one form of compressor of my invention, with the associated engine fan and radiator being indicated in phantom;

FIGS. 4 and 5 are corresponding views of modified forms of air flow controls.

Figure 2:
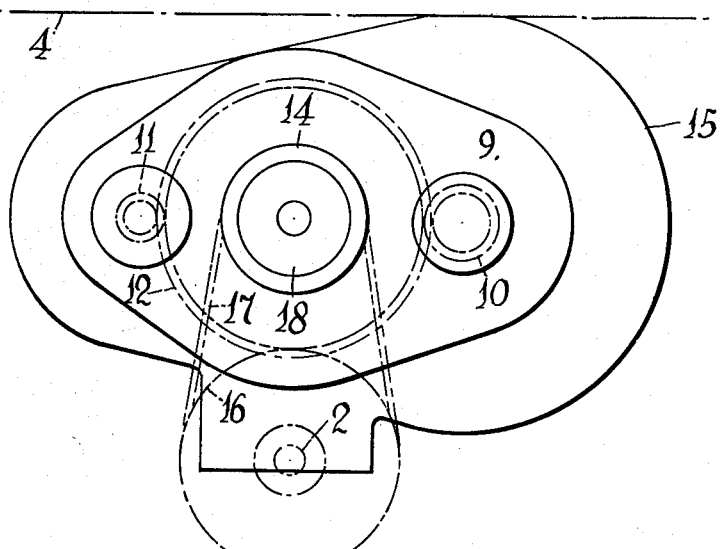
FIG. 2 is a front end elevational view thereof.

Referring now in detail to the illustrative embodiment of my invention depicted in the accompanying drawings, and particularly in FIGS. 1 and 2 thereof, there is shown, in phantom, a conventional truck engine 1 having a crankshaft 2 (FIG. 2) and a radiator 3. The connections between radiator 3 and engine 1, and the details thereof, are not shown because these parts are entirely conventional. The compressor of my invention is adapted to be fitted in the engine area beneath the usual hood 4 (FIG. 2) of such a conventional vehicle, and driven from the crankshaft 2 of the engine 1 thereof.

The compressor of my invention is of multi-stage design, comprising a first compressor stage 5 and a second compressor stage 6, with each stage comprising a centrifugal compressor of the type more fully set forth in my co-pending application Serial No. 129,476 entitled Air Compressor, executed simultaneously with this application and filed August 4, 1961. The rotors (not illustrated) of each compressor stage 5, 6 are mounted on their respective drive shafts 7, 8 which extend from the compressor housings into a drive gear housing 9. Shafts 7 and 8 carry pinions 10 and 11, respectively, both of which engage a drive gear 12 carried by a shaft 13 extending out of housing 9 and carrying a driven pulley 14. The compressor stages 5, 6 are carried on a mounting plate or bracket 15 positioned between the compressor housings and the gear housing 9 and providing a means of attachment thereof to the vehicle body or engine, at any desired point.

Pulley 14 is driven from the engine crankshaft 2 through a pulley 16 mounted on the crankshaft and connected to pulley 14 by a belt drive 17. Drive 17 comprises several individual V-belts, such a drive being available, for example, from Gates Rubber Company of Denver, Colorado, and identified by it as an HPV Belt. The drive connection is selectively engaged and disengaged by a clutch 18 mounted in the hub of pulley 14. Alternately, clutch 18 can be mounted in pulley 16. Such a clutch is available, for example, from Marquette Division, Curtiss Wright Corp., Cleveland, Ohio and is known as the Curtiss Wright Clutch, and is capable of remote operation under a suitable control, not illustrated, which can be positioned in the truck cab or wherever desired.

The first compressor stage 5 has an air inlet 20 and an air outlet 21, while the second compressor stage 6 has an air inlet 22 and an air outlet 23. The first stage outlet 21 and the second stage inlet 22 are interconnected by suitable air transfer means comprising, in the illustrated embodiment, conduits 24 and 25 and an interposed heat exchanger or intercooler 26. Heat exchanger 26 can be of a design similar to radiator 3, or of any appropriate design for cooling partially compressed air passing through intercooler 26 by the action of external or ambient air flowing over the intercooler 26.

In operation, compressor stages 5 and 6 are driven by the vehicle engine 1 through crankshaft 2, pulley 16, belt drive 17, pulley 14, gear 12 and pinions 10 and 11. Air entering at 20 is partially compressed by the first stage 5, and the partially compressed air to be transferred by conduits 24 and 25 to the second compressor stage 6, where it is further compressed. The partially compressed air is cooled, as it passes through intercooler 26. The fully compressed air is discharged through the second stage outlet 23 and discharge line 27.

This arrangement enables the compressor of my invention to fulfill its intended objects. The use of two, or more, stages provides compressor units of smaller size, easier to handle within the engine area of a truck, and permits cooling of the partially compressed air between stages. As a result of such interstage cooling, which is most important in my invention, it is possible to compress the air to a higher pressure than otherwise would be practical or possible with a compressor of such size. The belt drive 17 is very efficient, and the clutch 18 permits remote control of the drive connection from the truck engine to the compressor stages.

In the embodiment shown, the interstage heat exchanger 26 is positioned in the path of circulation of air through the truck radiator 3 by the usual fan 28. In this way, the heat exchanger 26 is cooled even when the truck is standing still, as will normally be the case when the compressor is operating.

Figure 3:
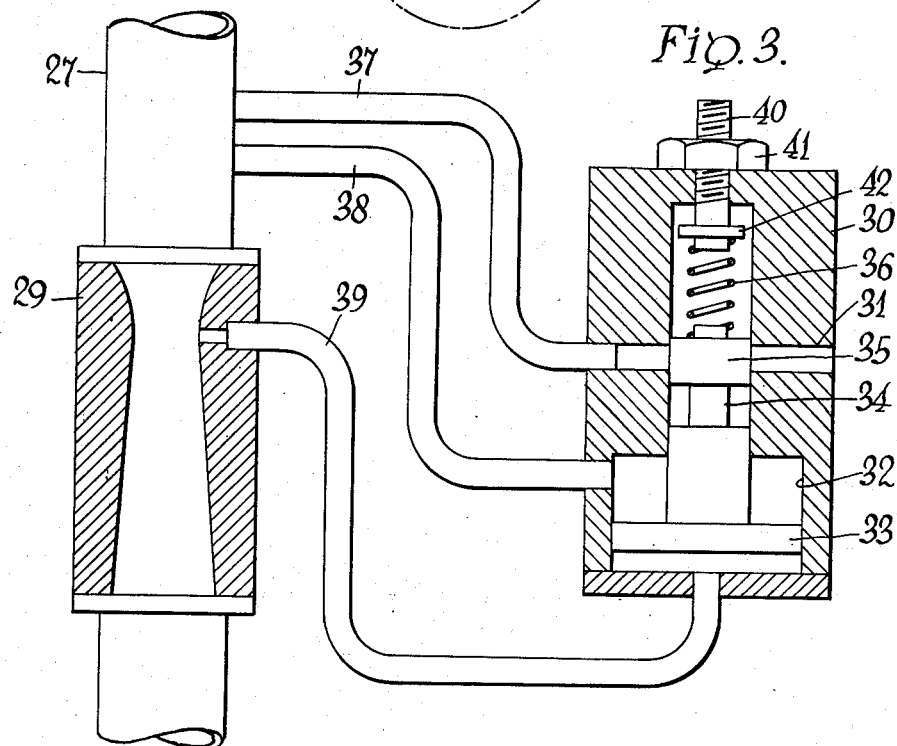
FIG. 3 is a generally schematic, fragmentary, sectional view, on an enlarged scale, of one form of air flow control of my invention.

To maintain the minimum air flow required to avoid over heating and/or stalling of the compressor, I provide an air flow control including a flow meter, generally designated 29, positioned in discharge line 27 and a bleed valve, generally designated 30, automatically operable to bleed air from discharge line 27 whenever the measured flow therethrough is reduced below a predetermined minimum. Several forms of such air flow control are depicted in FIGS. 3, 4 and 5. In each instance, flow meter 29 comprises a metering venturi.

Referring now to the embodiment of FIG. 3, control valve 30 comprises a housing having a bleed passage 31 therethrough and a piston chamber 32 containing a movable piston 33. Piston 33 is connected, through a stem 34 of reduced diameter, to a bleed valve 35 which normally is urged by spring 36 into bleed passage closing position, as illustrated. A bleed line 37 extends between discharge line 27 and bleed passage 31, a high pressure sensing line 38 extends between discharge line 27 and piston chamber 32 on one side of piston 33, and a low pressure line 39 extends between the throat of venturi 29 and chamber 32 on the opposite side of piston 33.

Venturi 29 causes a pressure drop, thereby creating a pressure differential which is transmitted by sensing lines 38 and 39 to chamber 32 on opposite sides of piston 33. This pressure differential increases with increased air flow, because the pressure at the venturi throat varies inversely with air flow therethrough.

As air flow through venturi 29 decreases to the minimum desired, the pressure sensed and transmitted by line 39 approaches that sensed and transmitted by line 38. When air flow drops below the pre-set minimum, the pressure transmitted by line 39 creates a thrust sufficient to overcome the thrust created by the pressure transmitted by line 38 to the piston face of lesser area and the bias of spring 36. As a result, the piston moves and shifts bleed valve 35 out of bleed passage closing position. This bleeds air through line 37 and passage 31, to maintain a minimum flow of air through the compressor.

Spring 36 opposes such opening of the bleed valve, opening in proportion to demand, and is adjustable by turning the bolt 40 in the fixed nut 41. This advances and retracts the shoulder 42, thereby varying the spring pressure. When adequate flow through venturi 29 resumes, the pressure differential moves piston 33 and shifts bleed valve 35 into bleed passage closing position.

The embodiment of FIG. 4 is much the same as FIG. 3, except that a dual piston, comprising a large piston 33' and a small piston 33" is provided. High and low pressure sensing lines 38, 39 cause the pressure differential produced by flow of air through venturi 29 to be transmitted to the small and large pistons, respectively, for shifting bleed valve 35' out of bleed passage closing position, against the action of spring 36, whenever minimum flow is not being maintained. Vents are provided in the housing, where required.

If desired, air can be bled through the venturi, by substituting an alternate bleed passage 37', connected to low pressure line 39, for line 37, and if a variable restriction 43 is placed between venturi 29 and the alternate bleed line 37', spring 36 can be eliminated. Flow through restriction 43 past the bleed valve 35' reduces the pressure to the large piston 33', and opposes the bleed valve opening, whereby the bleed valve opening will increase with demand.

In the embodiment of FIG. 5, housing 30" contains an air dump opening 44 normally closed by a disc or plug valve 35". The high pressure sensing line 45 also is the the bleed line, while the low pressure sensing line 39 places the venturi throat in communication with the housing chamber 32, to act against piston 46 in a manner opposing the valve closing spring 36 and also opposing the pressure on the dump valve 35", when the latter is seated. When the flow through the venturi becomes too small, the pressure acting against the relatively large piston 46 is sufficient to overcome the spring thrust and the thrust against the small piston valve 35", thereby opening the latter and bleeding the line.

It will be appreciated that other controls and accessories, such as an air receiver, engine governor, shut-off valve, filter, safety devices, and the like, can be used in conjunction with my invention as may be desired.

Accordingly, it is seen that my invention fully accomplishes its intended objects. While only one embodiment, with three forms of air flow control, has been disclosed and described in detail, this has been done by way of illustration only, without thought of limitation. I am well aware that variations therein and modifications thereof will occur to those skilled in the art, and intend to include the same within the scope of the appended claims. While I have disclosed my invention only in a vehicular installation, its utility is not so limited.

Having fully disclosed and completely described my invention, and its mode of operation, what I claim as new is:

1. A vehicle mounted air compressor comprising, in combination with a vehicle having an engine and a cooling system therefor including a radiator and a fan for circulating air in heat exchange relation with said radiator, a first centrifugal compressor stage mounted on said vehicle, air inlet means and air outlet means for said first compressor stage, a second centrifugal compressor stage mounted on said vehicle, air inlet means and air outlet means for said second compressor stage, means driving said first and second compressor stages from said engine, and conduit means interconnecting said first stage air outlet means and said second stage air inlet means, said conduit means including a heat exchanger disposed in the path of air circulated by said fan in heat exchange relation with said radiator for cooling partially compressed air passing from said first compressor stage to said second compressor stage.

2. A vehicle mounted air compressor as set forth in claim 1, wherein said first compressor stage is driven at a different speed from said second compressor stage.

3. A vehicle mounted air compressor as set forth in claim 1, wherein said means driving said first and second compressor stages includes a first pulley connected to said engine for being driven thereby, a second pulley connected to both of said compressor stages for driving the same, and belt drive means interconnecting said first and second pulleys.

4. A vehicle mounted air compressor as set forth in claim 3, together with clutch means incorporated in one of said pulleys and operable to selectively engage and disengage the drive connection between said engine and said compression stages.

5. A vehicle mounted air compressor comprising, in combination with a vehicle having an engine and a cooling system therefor, a first centrifugal compressor stage mounted on said vehicle and having an air inlet and an air outlet, a second centrifugal compressor stage mounted on said vehicle and having an air inlet and an air outlet, means driving said first and second compressor stages from said engine, and conduit means interconnecting said first stage air outlet and said second stage air inlet, said conduit means including heat exchanger means arranged in heat exchange relation to said vehicle engine cooling system for interstage cooling of partially compressed air.

6. A vehicle mounted air compressor as set forth in claim 5, wherein said first and second compressor stages are driven from said engine by means including first pulley means connected to said engine for being driven thereby, second pulley means connected to said compressor stages for driving the same, and beltdrive means interconnecting said pulley means.

7. A vehicle mounted air compressor as set forth in claim 6, together with remotely operable clutch means incorporated in one of said first and second pulley means and selectively operable to engage and disengage the drive connection between said engine and said compressor stages.

8. A vehicle mounted air compressor as set forth in claim 5, together with air flow control means automatically operable to maintain a predetermined flow of air through said second stage outlet at all times during operation of said compressor.

9. A vehicle mounted air compressor as set forth in claim 8, wherein said air flow control means includes means measuring the flow of air through said second stage outlet, and means operable to bleed air from said second stage outlet to atmosphere whenever the flow of air through said second stage outlet drops to a predetermined minimum level.

10. A vehicle mounted air compressor as set forth in claim 9, wherein said measuring means comprises a metering venturi.

11. A vehicle mounted air compressor comprising, in combination with a vehicle having an engine and a cooling system therefor, a first compressor stage mounted on said vehicle and having an air inlet and an air outlet, a second compressor stage mounted on said vehicle and having an air inlet and an air outlet, means driving said first and second compressor stages from said engine, and conduit means interconnecting said first stage air outlet and said second stage air inlet, said conduit means including heat exchanger means arranged in heat exchange relation to said vehicle engine cooling system for interstage cooling of partially compressed air, together with air flow control means automatically operable to maintain a predetermined flow of air through said second stage outlet at all times during operation of said compressor, wherein said air flow control means comprises a metering venturi in a discharge line from said second stage outlet, a bleed passage communicating with said discharge line, a bleed valve movable between bleed passage opening and bleed passage closing positions, piston means movable in a housing and connected to said bleed valve for moving the same, said piston means having one end face of relatively large area and an opposite end face of relatively small area, a high pressure sensing line placing said discharge line in communication with said housing at the relatively small end of said piston means, and a low pressure sensing line placing said venturi in communication with said housing at the relatively large end of said piston means, said piston means moving in response to a predetermined minimum pressure differential against the opposite ends thereof to move said bleed valve out of bleed passage closing position.

12. A vehicle mounted air compressor as set forth in claim 11, together with adjustable spring means biasing said bleed valve into bleed passage closing position.

13. A vehicle mounted air compressor as set forth in claim 11, wherein said bleed passage communicates with said discharge line through said low pressure sensing line, together with a variable restriction in said low pressure line between said venturi and said bleed passage.

14. A vehicle mounted air compressor comprising, in combination with a vehicle having an engine and a cooling system therefor, a first compressor stage mounted on said vehicle and having an air inlet and an air outlet, a second compressor stage mounted on said vehicle and having an air inlet and an air outlet, means driving said first and second compressor stages from said engine, conduit means interconnecting said first stage air outlet and said second stage air inlet, said conduit means including heat exchanger means arranged in heat exchange relation to said vehicle engine cooling system for interstage cooling of partially compressed air, with air flow control means automatically operable to maintain a predetermined flow of air through said second stage outlet at all times during operation of said compressor, and a discharge line from said second stage outlet, wherein said air flow control means comprises a metering venturi in said discharge line, bleed passage means communicating with said discharge line, a bleed valve movable to open and close said bleed passage means, a piston movable in a housing and connected to said bleed valve for moving the same between bleed passage opening and bleed passage closing positions, spring means biasing said bleed valve toward bleed passage closing position, and a pressure sensing line placing said venturi in communication with said housing for applying pressure against said piston in a direction opposing said spring means.

15. A vehicle mounted air compressor as set forth in claim 14, wherein said bleed valve has an end face of smaller area than the end face of said piston against which the venturi pressure is applied, and wherein said bleed passage comprises a high pressure sensing line applying pressure from said discharge line against said bleed valve end face.

16. A vehicle mounted air compressor comprising, in combination with a vehicle having an engine and a cooling system therefor, a first compressor stage mounted on said vehicle and having an air inlet and an air outlet, a second compressor stage mounted on said vehicle and having an air inlet and an air outlet, means driving said first and second compressor stages from said engine, and conduit means interconnecting said first stage air outlet and said second stage air inlet, said conduit means including heat exchanger means arranged in heat exchange relation to said vehicle engine cooling system for interstage cooling of partially compressed air, together with air flow control means automatically operable to maintain a predetermined flow of air through said second stage outlet at all times during operation of said compressor, wherein said air flow control means comprises a venturi communicating with said second stage outlet, bleed passage means communicating with said second stage outlet, and means measuring the pressure differential across said venturi and operable automatically to open said bleed passage whenever said pressure differential drops to a predetermined minimum.

17. An air compressor comprising, in combination with a cooling system, a first compressor stage having an air inlet and an air outlet, a second compressor stage having an air inlet and an air outlet, means driving said first and second compressor stages, and conduit means interconnecting said first stage air outlet and said second stage air inlet, said conduit means including heat exchanger means arranged in heat exchange relation to said cooling system for interstage cooling of partially compressed air, together with air flow control means automatically operable to maintain a predetermined flow of air through said second stage outlet at all times during operation of said compressor, wherein said air flow control means comprises a venturi communicating with said second stage outlet, bleed passage means communicating with said second stage outlet, and means measuring the pressure differential across said venturi and operable automatically to open said bleed passage whenever said pressure differential drops to a predetermined minimum.

18. A vehicle mounted air compressor comprising, in combination with a vehicle having an engine and a cooling system therefor including a radiator and a fan for circulating air in heat exchange relation with said radiator, a first compressor stage mounted on said vehicle, air inlet means and air outlet means for said first compressor stage, a second compressor stage mounted on said vehicle, air inlet means and air outlet means for said second compressor stage, means driving said first and second compressor stages from said engine, and conduit means interconnecting said first stage air outlet means and said second stage air inlet means, said conduit means including a heat exchanger disposed in the path of air circulated by said fan in heat exchange relation with said radiator for cooling partially compressed air passing from said first compressor stage to said second compressor stage, together with air flow control means connected to said second stage outlet means and maintaining a predetermined minimum discharge of air from said second compression stage.

19. A vehicle mounted air compressor as set forth in claim 18, wherein said air flow control means comprises bleed means automatically operable in response to the flow of air through said second stage outlet means to maintain said predetermined minimum discharge.

References Cited in the file of this patent

UNITED STATES PATENTS

| | | |
|---|---|---|
| 797,790 | Caffall | Aug. 22, 1905 |
| 1,027,923 | Spohrer | May 28, 1912 |
| 1,110,864 | Banner | Sept. 15, 1914 |
| 1,154,959 | Banner | Sept. 28, 1915 |
| 1,382,018 | Schreiber | June 21, 1921 |
| 1,503,002 | Nagy | July 29, 1924 |
| 1,636,291 | Davy et al. | July 19, 1927 |
| 1,994,874 | Sams et al. | Mar. 19, 1935 |
| 2,108,223 | Young | Feb. 23, 1938 |
| 2,166,635 | Locke | July 18, 1939 |
| 2,181,851 | Schlumbohm | Nov. 28, 1939 |
| 2,595,098 | Poglay | Apr. 29, 1952 |
| 2,902,205 | Parker | Sept. 1, 1959 |